United States Patent [19]

Baskin

[11] 4,385,088
[45] May 24, 1983

[54] DECORATIVE ARTIFICIAL ROCK-LIKE ARTICLE

[76] Inventor: David Baskin, 116 Billings St., Sharon, Mass. 02067

[21] Appl. No.: 266,627

[22] Filed: May 22, 1981

[51] Int. Cl.³ .............................................. B44F 9/04
[52] U.S. Cl. .................................... 428/15; 206/518; 428/35
[58] Field of Search .............. 52/81; 428/15, 35, 409; 206/515–518

[56] References Cited

U.S. PATENT DOCUMENTS

| | | | |
|---|---|---|---|
| 2,756,493 | 7/1956 | Hall et al. | 29/424 |
| 2,928,456 | 3/1960 | Potchen et al. | 428/251 |
| 2,953,469 | 9/1960 | Fox | 428/15 X |
| 3,192,063 | 6/1965 | Donofrio | 428/15 X |
| 3,232,017 | 2/1966 | Prusinski et al. | 52/309 |
| 3,256,133 | 6/1966 | Wright et al. | 428/480 X |
| 3,284,969 | 11/1966 | Walters et al. | 52/81 X |
| 3,298,894 | 1/1967 | Barnette | 428/68 |
| 3,344,222 | 9/1967 | Shapiro et al. | 156/245 X |
| 3,396,062 | 8/1968 | White | 264/256 X |
| 3,674,598 | 7/1972 | Mayer et al. | 156/345 |
| 3,973,510 | 8/1976 | McCulloch et al. | 114/67 A |
| 4,019,296 | 4/1977 | Jochmann | 52/268 |
| 4,084,021 | 4/1978 | Sandvig | 427/44 |
| 4,120,418 | 10/1978 | Collins et al. | 220/444 |
| 4,189,414 | 2/1980 | Kikuchi et al. | 260/294 R |
| 4,241,554 | 12/1980 | Infantino | 52/314 |
| 4,318,945 | 3/1982 | Goldman et al. | 428/15 |

FOREIGN PATENT DOCUMENTS 1063533  10/1979  Canada .............................. 206/518

Primary Examiner—Henry F. Epstein
Attorney, Agent, or Firm—James H. Grover

[57] ABSTRACT

An artificial decorative rock of foamed synthetic plastic having a body with an outer surface resembling the concavities and convexities of a natural rock has its outer surface coated with a strengthening layer of epoxy resin filled with hard sand-like particles which give the outer surface a rock simulating, grained texture. By forming a hollow within the surface of one body to complimentarily accommodate the outer surface of another body, one or more artificial decorative rocks can be nested, one within the other. By further shaping the uppermost outer surface of such hollow body to provide a stable support base, the body with the hollow extending upwardly can serve as a container.

8 Claims, 7 Drawing Figures

DECORATIVE ARTIFICIAL ROCK-LIKE ARTICLE

BACKGROUND OF THE INVENTION

Large rocks or boulders have been used for decorative or simulative purposes in landscape gardening, museum dioramas and marine seascapes. Natural rocks are obviously very heavy to handle and may be too heavy to be supported on conventional floors. Similarly artificial rocks made of concrete or plaster of Paris are undesirably heavy. Other artificial objects made, for example, of a relatively thin skin of paper mache are light and easy to handly but are difficult to form with a natural rock-like surface and are so weak in structure as to be incapable of supporting appreciable weight, and are fragile and easily stripped of colored coating.

It is the object of the present invention to provide an artificial rock or similar decorative form which is light in weight and reasonably easily handled, which has a natural rock-like textured surface, and yet which is strong enough to support superimposed weights and is resistant to chipping, scarring and breakage.

SUMMARY OF THE INVENTION

According to the invention a method of making an artificial rock-like decorative form which comprises shaping body of plastic material with an irregular surface of rock-like concavities and convexities; and applying to the shaped surface of the body a spray of liquid epoxy resin and of relatively hard sand-grain-sized particle; thereby to coat the surface with a particle filled epoxy resin layer substantially strengthening the body and lending a grained texture simulating a rock surface.

Further according to the invention an artificial rock-like decorative form comprises a body of foamed synthetic plastic having an exterior surface with rock-like concavities and convexities and coated with a strengthening layer of epoxy resin filled with hard sand-grained-sized particles giving the surface a grained texture simulating a rock.

DRAWING

DESCRIPTION

Shown in FIGS. 1 to 4 are the steps of making an artificial rock according to the invention. The process begins with a solid, rectangular block 1 of expanded polystyrene (EPS), also known as Styrofoam. Such a block of foamed plastic material comprises air spaces trapped in the plastic, is of very light weight, and as a whole has structural strength, but has very low surface strength and is easily pierced or crushed in small areas. White Styrofoam may be used.

Figure 1:
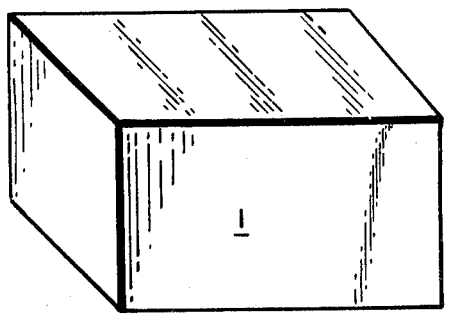
FIG. 1 is an isometric view of a block of foamed synthetic plastic.
Figure 2:
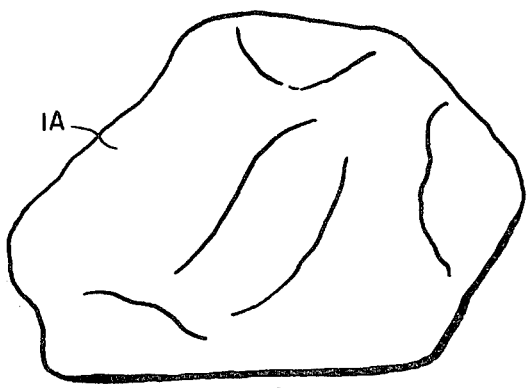
FIG. 2 shows the block of FIG. 1 sculptured to rock-like form.
Figure 3:
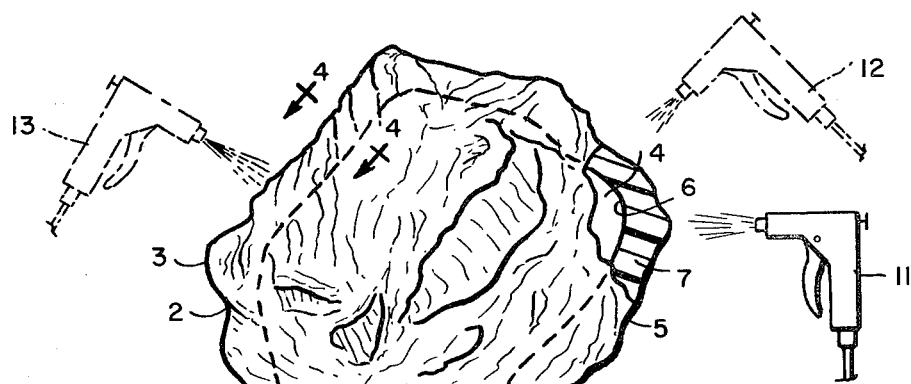
FIG. 3 shows the spraying of the sculptured form with a coating.
Figure 4:
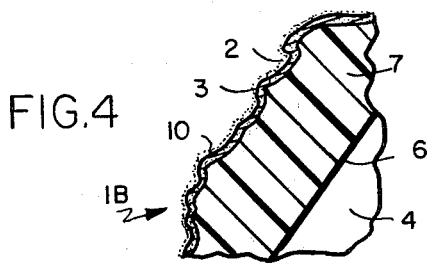
FIG. 4 is an enlarged section on line 4—4 of FIG. 3.

The first step is the rough shaping or contouring of the block to general rock-like form 1A as shown in FIG. 2. The shaping may be done with simple cutting and scraping hand tools such as knives, scrapers, or heated tools such as soldering irons, on the exterior 5 of the form to simulate the concavities 2 and convexities 3 characteristic of a natural rock.

A hollow 4 is preferably formed inside the rock-like exterior 5 at the interior surface 6 of a wall 7 surrounding the hollow 4. The hollow opens on and extends inwardly of a rim 8 at least three points of which define a plane on which the body of the rock-like form may be rested stably. In addition to forming the hollow 4, fine detail may be sculptured on the rough form 1A as shown by form 1B of FIG. 3. The wall 7 is typically six inches thick.

In the final stage of making the rock-like form, liquid epoxy resin, hard particles and preferably dark brown, grey and other rock-like pigments are sprayed on the sculptured form 1B. The epoxy, sand and pigment may be sprayed on separately or concomitantly while the epoxy is still tacky, by separate spray guns 11, 12, 13 or they may be sprayed on simultaneously by one gun 11. The filler particles are preferably sand in its normal range of sizes, 100 grit being typical, although other hard, sand-grain-sized particles may be used. The epoxy resin is applied in a quantity sufficient to form a coating 10, 5 to 20 mils thick for small rocks (one to two feet thick) up to one quarter inch thick for large rocks (six feet thick, e.g.). The coating combination of epoxy resin and sand particle filler in the described thickness imparts a surprising strength to the frangible styrofoam body. Rocks so coated with a six inch wall 7 will support a 200 pound moving human. Neither sand nor epoxy alone provide such strength, and despite the filling effect of the sand the pigment color shows through the sand. In addition to strengthening the rock form generally, hardening its surface, the sand aids the pigment in coloring the surface and giving it a rock-like grained texture, natural in appearance and also having antiskid properties advantageous on installations where workers must walk.

Figure 5:
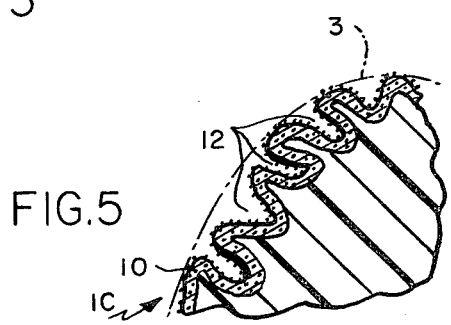
FIG. 5 is a further enlarged section of a modified rock-like form.

In addition to the sand-grained texture characteristic of many rocks, the rock form may be given the pitted or pocked surface appearance of coral rock by including xylene in the fluid epoxy spray in the proportion of one to ten by volume. Xylene will dissolve the Styrofoam substrate at spaced points producing coral-like pits 12C of substantially smaller size than the concavities and convexities of the rock as shown in FIG. 5. Sand and pigment may be included with the epoxy and xylene mixture.

Figure 6:
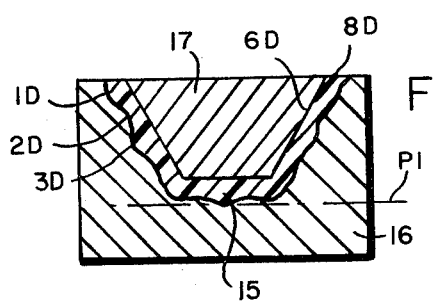
FIG. 6 is a vertical sectional view showing the molding of a rock-like container.
Figure 7:
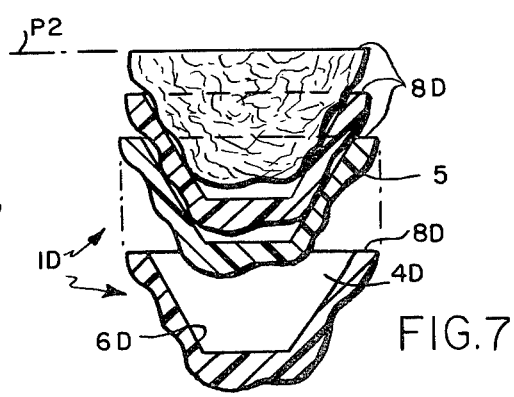
FIG. 7 shows a plurality of the containers of FIG. 6 in elevation and section.

The above described artificial decorative rock is particularly well adapted to hand sculpturing, but similar rock forms may be reproduced by injection molding the uncoated Styrofoam body as shown in FIG. 6 wherein a hollow rock-like article 1D is formed between an outer mold 16 and a core 17. The exterior surface 5D of the molded article 1D is irregularly contoured with concavities 2D and convexities 3D like the sculptured rock 1B. The hollow 4D defined by the interior surface 6D is shaped complementarily to the general envelope of the body exterior to receive a like body with the exterior nesting within the hollow of the like body, as shown in FIG. 7. The base 15 at the exterior of the body outside the bottom of the hollow has at least three points defining a first plane P1 (FIG. 6) and on which the body may be rested stably with the hollow 4D opening upwardly so that the rock body may act as a container. The hollow 4D opens on a rim 8D defining a second plane P2 on which the body may be alternatively, hollow downward, stably rested to simulate a rock.

It should be understood that the present disclosure is for the purpose of illustration only and that this invention includes all modifications and equivalents which fall within the scope of the appended claims.

I claim:

1. An artificial rock-like decorative form comprising: a body of foamed synthetic plastic generally of the three dimensional, non-planar, irregular form of a natural rock and having an exterior surface with large scale rock-like concavities and convexities and coated with a strengthening layer of epoxy resin filled with hard sand-grain-sized particles giving the surface a small scale grained texture simulating a rock, the layer being a small fraction of the thickness of the plastic so as to conform to the body shape and exhibit its concavities and convexities as well as the smaller grained structure without adding significantly to the weight of the body.

2. A decorative form according to claim 1 wherein the coated layer includes a pigment.

3. A decorative form according to claim 1 wherein the concavities and convexities of the surface have substantially smaller pits simulating coral rock.

4. A decorative form according to claim 1 wherein the body forms a hollow within the surface.

5. A decorative form according to claim 4 wherein the exterior of the body is shaped to nest within the hollow of a like body.

6. A decorative form according to claim 4 wherein the hollow opens from the body at the rim defining a plane on which the body may be rested stably.

7. A decorative form according to claim 4 wherein the hollow opens from the body at a rim, and the body surface remote from the rim defines a base stably supporting the body with the hollow extending upwardly to act as container.

8. A combination artificial decorative rock and container comprising:

a body of synthetic foam plastic having an exterior coated with a strengthening layer of epoxy resin filled with sand particles and being in the shape of a rock, a rim and a hollow extending inwardly of the rim to a bottom, the hollow being shaped complementarily to the exterior so as to recieve a like body, the exterior having a rock textured surface and the hollow having a coating over the foam, the exterior having outside the bottom of the hollow a structure for standing the body upward as a container, and the rim being adapted to stand the body, hollow downward, as a rock.

* * * * *